United States Patent
Farooq et al.

(10) Patent No.: US 9,512,012 B2
(45) Date of Patent: *Dec. 6, 2016

(54) SONOELECTROLYSIS FOR METAL REMOVAL

(75) Inventors: Robina Farooq, Lahore (PK); Saleem Farooq Shaukat, Lahore (PK); Asim Yaqoob, Lahore (PK); Umar Farooq, Abbottabad (PK)

(73) Assignee: COMSATS INSTITUTE OF INFORMATION TECHNOLOGY, Lahore (PK)

( * ) Notice: Subject to any disclaimer, the term of this patent is extended or adjusted under 35 U.S.C. 154(b) by 1130 days.

This patent is subject to a terminal disclaimer.

(21) Appl. No.: 11/953,035

(22) Filed: Dec. 8, 2007

(65) Prior Publication Data

US 2009/0145774 A1    Jun. 11, 2009

(51) Int. Cl.
C02F 1/461    (2006.01)
C02F 1/36    (2006.01)
C02F 1/467    (2006.01)
C02F 1/66    (2006.01)
C02F 101/20    (2006.01)

(52) U.S. Cl.
CPC ............... C02F 1/36 (2013.01); C02F 1/4678 (2013.01); C02F 1/66 (2013.01); C02F 2001/46142 (2013.01); C02F 2101/20 (2013.01); C02F 2201/4617 (2013.01)

(58) Field of Classification Search
CPC ...... C02F 1/36; C02F 1/461; C02F 1/46104; C02F 2101/20; C02F 1/4678; C25C 1/18
USPC ....... 205/261, 263, 264, 265, 271, 272, 291, 205/292, 299, 320, 742, 759, 760, 761, 771

See application file for complete search history.

(56) References Cited

U.S. PATENT DOCUMENTS

| | | | |
|---|---|---|---|
| 3,577,334 A * | 5/1971 | Graham et al. ............... | 204/223 |
| 3,650,925 A | 3/1972 | Carlson | |
| 3,748,240 A * | 7/1973 | Johnson et al. .... | C02F 1/46109 |
| | | | 205/760 |
| 3,755,113 A | 8/1973 | Entshev et al. | |
| 3,899,405 A * | 8/1975 | Iverson et al. ................ | 205/759 |
| 4,028,199 A * | 6/1977 | Holland .............. | C02F 1/46109 |
| | | | 204/218 |
| 4,155,821 A | 5/1979 | Grontoft | |
| 4,190,508 A * | 2/1980 | Kametani ............... | C02F 1/463 |
| | | | 205/746 |
| 4,235,695 A | 11/1980 | de Nora et al. | |
| 4,310,395 A | 1/1982 | Huss et al. | |
| 4,640,746 A * | 2/1987 | Nobel et al. ................... | 205/123 |
| 5,217,585 A | 6/1993 | Snyder et al. | |
| 5,302,278 A * | 4/1994 | Nobel et al. ................... | 205/291 |
| 5,690,806 A | 11/1997 | Sunderland et al. | |
| 6,238,546 B1 * | 5/2001 | Knieper .............. | C02F 1/46104 |
| | | | 204/269 |
| 6,517,701 B1 * | 2/2003 | Geisler ................. | C22B 3/0066 |
| | | | 205/538 |
| 6,746,590 B2 | 6/2004 | Zhang et al. | |
| 6,835,294 B2 * | 12/2004 | Tsuchida et al. ............. | 205/291 |
| 2002/0027083 A1 * | 3/2002 | Fritz-Langhals ............. | 205/299 |
| 2003/0042145 A1 * | 3/2003 | Zhang et al. .................. | 205/148 |
| 2003/0070934 A1 * | 4/2003 | Cobley et al. ................ | 205/263 |
| 2003/0196901 A1 * | 10/2003 | Grunes .......................... | 205/88 |
| 2005/0077250 A1 * | 4/2005 | Goosey ..................... | C02F 9/00 |
| | | | 210/748.15 |
| 2006/0243595 A1 * | 11/2006 | Henuset .................. | C25C 7/002 |
| | | | 205/143 |
| 2007/0142693 A1 * | 6/2007 | Adachi ................... | B09C 1/085 |
| | | | 588/318 |
| 2009/0242424 A1 * | 10/2009 | Behr ....................... | C02F 1/463 |
| | | | 205/757 |

FOREIGN PATENT DOCUMENTS

| | | | | |
|---|---|---|---|---|
| JP | 59-75691 | | 4/1984 | |
| SG | WO 2007050041 A1 * | 5/2007 | ............. | C02F 1/463 |
| WO | WO 2005035149 A1 * | 4/2005 | ............. | B09C 1/085 |
| WO | WO 2007071256 A1 * | 6/2007 | .......... | C02F 1/46104 |

OTHER PUBLICATIONS

R. Farooq, Y. Wang, F. Lin, S.F. Shaukat, J. Donaldson, A.J. Chouhdary. "Effect of ultrasound on the removal of copper from the model solutions for copper electrolysis process." Water Research. Jul. 2002. vol. 36, Issue 12. pp. 3165-3169.*

Nathaniel H. "The effect of voltage on copper electroplating." Science Project 2005. Wayback Machine Capture from Dec. 2005. Retrieved from <http://web.archive.org/web/20051204040433/http://www.selah.k12.wa.us/SOAR/SciProj2005/NathanielH.html>.*

Walker, R. "Ultrasound improves electrolytic recovery of metals." Jan 1997. Ultrasonics Sonochemistry. vol. 4, Issue 1. pp. 39-43.*

Gonzalez-Garcia, J.; Esclapez, M.D.; Bonete, P.; Hernandez, Y.V.; Garreton, L.G.; and Saez, V. "Current topics on sonoelectrochemistry." Ultrasonics. Sep. 29, 2009. vol. 50, Issue 2. pp. 318-322.*

Lou, H.H. and Huang, Y. "Electroplating." Encyclopedia of Chemical Processing. Sep. 1, 2006 capture of <http://chem1.eng.wayne.edu/~yhuang/Papers/Book_Plating_ECHP.pdf> using Wayback Machine Internet Archive.*

Sandoval-Gonzélez et al. "Ultrasound Leaching and Electrochemical Treatment Combined for Lead Removal Soil" Journal of New Materials for Electrochemical Systems. Jun. 2007. vol. 10, Issue 3. pp. 195-199.*

Walker, Robert. "The Role of Ultrasound in the electrowiing and electro-refining of metals" Hydrometallurgy. Jun. 1979. vol. 4, Issue 3. pp. 209-215.*

Lupi et al., "Studies concerning nickel electrowinning from acidic and alkaline electrolytes," Minerals Engineering 19, 2006, pp. 1246-1250, Elsevier.

Fornari et al., "Copper and nickel selective recovery by electrowinning from electronic and galvanic industrial solutions," Hydrometallurgy 52, 1999, pp. 209-222, Elsevier.

Orhan et al., "Nickel recovery from the rinse waters of plating baths," Hydrometallurgy 65, 2002, pp. 1-8, Elsevier.

(Continued)

Primary Examiner — Steven A. Friday
(74) Attorney, Agent, or Firm — H.C. Park & Associates, PLC

(57) ABSTRACT

A process for removal of heavy metals at contamination level (50-500 mg/L) using ultrasonic energy and electrolysis, as a measure to decontaminate industrial waste, is described.

4 Claims, 1 Drawing Sheet

(56) References Cited

OTHER PUBLICATIONS

Sirajuddin et al., "Electrolytic Recovery of Nickel from Industrial Hydrogenated Vegetable Oil (Ghee) Waste," Acta Chim. Slov., 2004, 51, 793-798.

Huang, "Effect of Surfactants on Recovery of Nickel from Nickel Plating Wastewater by Electrowinning," Wat. Res., 1995, pp. 1821-1826, vol. 29, No. 8, Elsevier Science Ltd., Great Britain.

Cognet et al., "Ultrasound in organic electrosynthesis," Ultrasonics Sonochemistry 7, Oct. 2000, pp. 163-167, Elsevier.

Compton et al., "Dual activation: coupling ultrasound to electrochemistry—an overview," Electrochimica Acta, 1997, pp. 2919-2927, vol. 42, No, 19, Elsevier Science Ltd., Great Britain.

Klima et al., "Sonoelectrochemistry: Effects of ultrasound on voltammetric measurements at a solid electrode," Journal of Electroanalytical Chemistry, 1994, pp. 297-300.

Lamminen et al., "Mechanisms and factors influencing the ultrasonic cleaning of particle-fouled ceramic membranes," Journal of Membrane Science 237, 2004, pp. 213-223, Elsevier.

Mason et al "Ultrasonic intensification of chemical processing and related operations: A Review," Transactions of IChemE, Jul. 1996, pp. 511-516, vol. 74, Part A.

Mettin et al., "Bubble size distributions and structures in acoustic cavitation," Proc. 2nd Conf. on Applications of Power Ultrasound in Physical and Chemical Processing, pp. 125-129, Toulouse, France.

"Revised National Environmental Quality Standards (NEQS)", Dec. 1999, Pakistan.

Wadhawan et al., "Emulsion electrosynthesis in the presence of power ultrasound Biphasic Kolbe coupling processes at platinum and boron-doped diamond electrodes," Journal of Electroanalytical Chemistry 507, 2001, pp. 135-143.

Walton et al., "Sonoelectrochemistry," Advances in Sonochemistry, 1996, pp. 205-284, vol. 4, JAI Press Inc.

"Guidelines for Drinking-Water Quality," World Health Organization, 1984, pp. 184-187, Geneva, Switzerland.

Non-Final Office Action issued on Sep. 30, 2011 in U.S. Appl. No. 13/049,843.

Cunningham et al., "Environmental Science," McGraw Hill, International Edition, 2007, pp. 399-405.

Sawyer et al., "Chemistry for Environmental Engineering and Science," McGraw Hill, First Edition, 2003, pp. 718-723.

Andrew et al., "Standard Methods for the examination of water and wastewater," American Public Health Association, American Water Works Association and Water Environment Federation, 21st Edition, 2005, pp. 3-15.

Walker, R., "Ultrasonic Agitation in Metal Finishing," Advances in Sonochemistry (ed. by T. J. Mason), 1993, pp. 125-145, vol. 3, (JAI Press, London).

G. Cushnie, "Electrowinning in pollution prevention and control technology for plating operations." NCMS/INAMF Pollution Control Assessment. 1994. pp. 117-138.

Final Office Action issued on Feb. 20, 2015 in U.S. Appl. No. 13/049,843.

Kern, E.F. et al. "Electrodeposition of Nickel" Dec. 1908. Electrochemical and Metallurgical Industry: A monthly journal of electrochemistry and chemical and metallurgical engineering. Volume VI. pp. 365.

Parkinson, Ron. "Nickel Plating and electroforming: Essential industries for today and the future." Nickel Development Insitute. Jun. 2001.

Final Office Action issued on Oct. 14, 2015, in U.S. Appl. No. 13/049,843.

Notice of Allowance issued Mar. 16, 2016, in U.S. Appl. No. 13/049,843.

Non Final Office Action issued on Apr. 28, 2015 in U.S. Appl. No. 13/049,843.

* cited by examiner

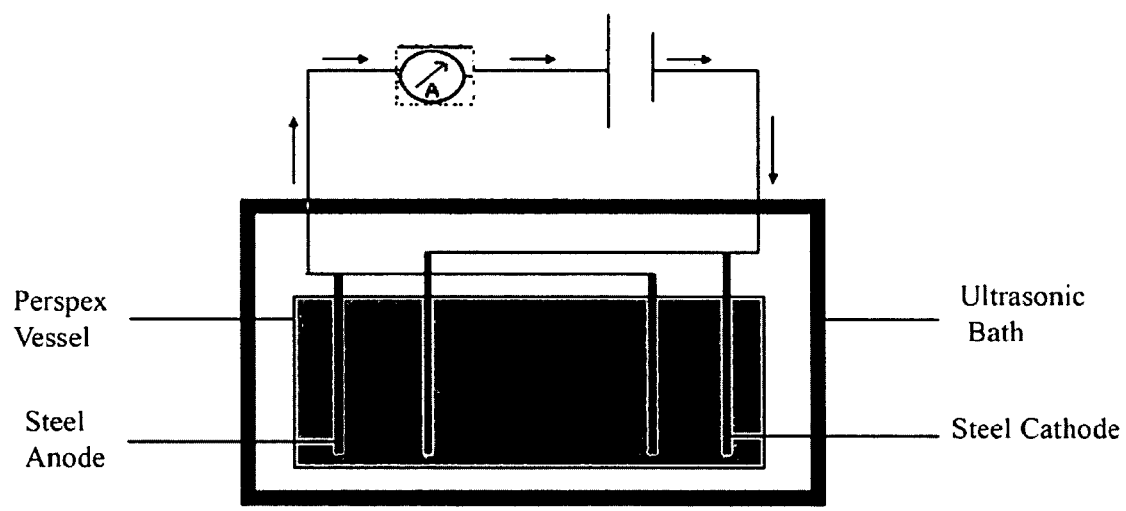
Reactor for sonoelectrolysis

SONOELECTROLYSIS FOR METAL REMOVAL

BACKGROUND

Field

Exemplary embodiments of the present disclosure relate to a novel method of sonoelectrolysis for metal removal.

Discussion

Removal of heavy metals from industrial wastewater is of primary importance because they not only cause contamination of water bodies but are also toxic to flora and fauna. Industrial processes generate wastewater containing heavy metal contaminants, which invariably are toxic and non-degradable. Heavy metals cause damage to the nervous system and the kidney. Heavy metals toxicity also causes cancer and other metabolic disturbances. The metals of most immediate concern are chromium, lead, zinc, iron, mercury and lead. The concentration of these metals must be reduced to acceptable levels before discharging them into the environment.

The typical heavy metals discharging industries are electroplating industry, tanneries, battery industry, and metallurgy, etc. Electroplating wastewater is by far the most important environmental problem in developing countries as it is highly polluting utilizing a variety of chemicals. Similarly, tanneries discharge highly polluted wastewater in terms of chemical oxygen demand, total suspended solids, chromium, copper, iron and zinc, well above the maximum standards established worldwide putting extensive strain on the environmental control efforts in the developing world.

A major challenge facing humanity today is to provide clean water to the population around the world, particularly in the developing countries, where fast development of industrial infrastructure has heavily taxed the supply and quality of water. There is, therefore, an urgent need to develop innovative, more effective and affordable techniques for waste-water treatment that will allow recycling of water and reduce the health hazards from contamination of industrial effluents.

A wide range of wastewater treatment techniques are currently used including biological processes for nitrification, denitrification, phosphorous removal, as well as a range of physicochemical processes requiring chemical treatment. The commonly employed physicochemical treatment processes used in the water industry are micro and ultra-filtration, ion-exchange (anionic and cationic), chemical precipitation and oxidation, carbon adsorption, reverse osmosis, electro-dialysis, and air and gas stripping, and volatilization. Many of these techniques are expensive to use.

Novel techniques that expedite removal of contaminants from water supply are widely studied; for example, sono-electrochemistry has also been proposed for the treatment of toxic wastes since it offers several advantages. It has been suggested that the removal of phenol from industrial effluents by electrochemical oxidation is accelerated in the presence of ultrasound. It is possible to induce almost 80% oxidation of phenol to maleic acid when ultrasound is applied compared to less than 50% when ultrasound energy is not used. Hydroxyl radicals appear to be the main active reagent that reacts with the organic compound, whose oxidation can be enhanced by combining various traditional techniques (e.g., $O_3/H_2O_2$, $UV/H_2O_2$, ultrasound/$O_3$ and $UV/H_2O_2$/ultrasound). Sonoelectrochemistry can also be employed in the disinfection of sewage and potable water. For example, in the water industry, chlorine disinfection has proved to be successful in eradicating water-borne diseases (e.g., those caused by *cryptosporidium* and *E. coli*). Chlorine is often produced on-site by electrolyzing hydrochloric acid and thus helps in the disinfection of environmentally toxic effluents. It has been found that electrolyzing 22% hydrochloric acid, approximately 59% of chlorine was evolved in the presence of ultrasound compared with 1% in the absence of ultrasound. Thus sonoelectrochemical waste treatment may reduce energy requirement in removing environmental pollutants from water.

Other promising techniques based on electrochemical technology have been developed but are not yet been commercialized. One of these processes is known as electrocoagulation, an electrochemical method of treating polluted water and effluents whereby sacrificial anodes oxidize (or corrode) to release active coagulant precursors (usually aluminum and/or iron ions) into the solution. In other words, the coagulant is generated 'in-situ' by electrolysis. Electrocoagulation has a long history as a wastewater treatment technology having been used for the removal of a wide range of pollutants (mainly inorganic and organic components). However, electrocoagulation has never become accepted as a 'mainstream' water treatment technology due to the difficulties in designing a practical electrocoagulation reactor mainly due to the issue of electrode reliability (particularly passivation of the anode over time also called 'electrode fouling').

Whereas the removal and recovery of heavy metals is normally accomplished by adsorption, ion exchange, chemical precipitation, membrane separation and electrochemical deposition, the efficiency and the cost of removing low level contamination remains high and often out of the reach of countries where the problems are more severe.

SUMMARY

In the present invention, a novel, low-cost technique of applying ultrasound energy in an electrochemical cell to remove the heavy metals from water is described; the application of this technique allows otherwise contaminated water to be recycled as potable water. The novel technique reported here accomplishes this by establishing unobvious reaction conditions in the electrolysis process with ultrasound, which reduce the time of removal and deposition of metals and also reduces the cost due to reduced energy requirement to complete these reactions. These goals are achieved through the novel use of ultrasonic energy which creates agitation (via cavitations) by disturbing the diffusion layer and thus increasing the deposition of electroactive species more evenly across the electrode double layer.

Thus, one aspect of this invention is to provide an efficient model of sonoelectrolytic cell, which reduces the cost of energy consumption and deposition time; in another aspect of the invention, the recovery and removal of heavy metals form from contaminated water makes it possible for the water to be recycled, particularly for the purpose of drinking.

BRIEF DESCRIPTION OF DRAWING

FIG. 1 is a diagrammatic representation of the various components of the reactor for sonoelectrolysis.

DETAILED DESCRIPTION

A model instrument invented here comprises modifications to standard electrolysis chamber made of poly (methyl methacrylate) sheet, whose dimensions were chosen according to the volume of the ultrasonic bath that contained this electrolysis chamber (FIG. 1). Two different metals for electrodes were selected. For a cathode, stainless steel was used and, for an anode, platinized titanium electrode, whose position within the electrolysis cell was optimized on the basis of trial and error, was used. Both electrodes were connected to a source of electricity through a DC power supply that also allowed measurement of energy consumption. The electrodes of stainless steel and platinized titanium had the optimal dimensions of 14 cm×15 cm and were tested as plates or meshes. The ultrasonic bath [Heated Digital Ultrasonic Bath of DU series (DU-8), dimensions 30×24×15 cm] had four transducers that emit ultrasonic waves of 20-100 KHz frequency. Test solutions of desired metal concentration were prepared and the treatment samples were collected from the effluent of the respective industries. For the detection of concentration of these metals, an atomic absorption spectrophotometer was used according to the prescribed standard methods.

FIG. 1 Reactor for sonoelectrolysis

The surprising combination of various critical parameters yielded maximum metal removal with greatest efficiency of energy use resulting in reduced cost of the process. The critical parameters include:
1. Ultrasonic application
2. pH
3. Current
4. Voltage
5. Temperature
6. Concentration of metals in solutions
7. Types of electrodes
8. Frequency of ultrasound
9. The spacing between the electrodes
10. Effect of Retention Time Whereas the use of ultrasound is known to alter the electro-deposition process, the exact nature of how the use of ultrasonic waves alters the process remains experimental and unpredictable. Table 1 shows the percentage recovery under ultrasonic agitation, where comparisons are made between simple electrolysis in the absence of ultrasound (US off) and in the presence of ultrasound (US on).

TABLE 1

Percentage recovery of lead using plate cathodes in the presence and absence of ultrasonic field after 4 hours of electrolysis.

| Conc. (mg L$^{-1}$) | Recovery of lead (%) | |
|---|---|---|
| | Electrolysis + Ultrasound | Electrolysis |
| 50 | 98 | 52.4 |
| 100 | 94.6 | 55.1 |
| 200 | 95.5 | 63.1 |
| 300 | 98.3 | 71.2 |
| 400 | 97.5 | 78.6 |
| 500 | 97.3 | 83.1 |

The results presented in Table 1 demonstrate that the percentage recovery in the presence of ultrasound is higher as compared with the simple electrolysis under the prescribed conditions of this invention. Ultrasonic waves accelerated the diffusion of ions from the bulk of solution towards the electrodes surface. This increased the percentage recovery as the imposition of ultrasound accelerated the charge transfer process more efficiently for electrodeposition of lead. Table 2 shows the effect of ultrasound on energy consumption.

TABLE 2

Effect of ultrasound on the energy consumption after 4 hours of electrolysis.
Energy Consumption (kWh/mg)

| Conc. (mg L$^{-1}$) | Electrolysis + Ultrasound (40 kHz) | | Electrolysis | |
|---|---|---|---|---|
| | Plate | Mesh | Plate | Mesh |
| 50 | 0.096 | 0.088 | 0.136 | 0.129 |
| 100 | 0.057 | 0.050 | 0.086 | 0.072 |
| 200 | 0.025 | 0.019 | 0.034 | 0.028 |
| 300 | 0.017 | 0.011 | 0.024 | 0.019 |
| 400 | 0.012 | 0.0087 | 0.017 | 0.014 |
| 500 | 0.0098 | 0.0091 | 0.0137 | 0.0136 |

In the observation reported above (Table 2), the energy consumption was reduced by almost one-third when sonoelectrolysis was used; a more efficient reduction of energy was observed when the electrodes used were in the form of a mesh rather than a plate.

The literature studies showed that concentration of hydrogen ions also affects the flow of current in the solution, which leads to increase the deposition rate. The pH affects the heavy metals recovery as well as anodic dissolution. It was discovered that the anodes dissolve in solution in simple electrolysis process. The results showed that recovery of lead is best at pH 3.5 and at this pH, the anodic dissolution in the presence of ultrasound is also reduced.

The flow of current through aqueous solution depends upon the concentration of positive and negative ions in the solution and voltage applied. Increasing current through the solution increased deposition or percentage recovery of lead. As the concentration of lead in the solution was low, due to this reason voltage applied from the battery was 10 volts, which gave desired current flow. High current flow and high voltage also increases the operating cost but by applying ultrasound this cost can be reduced because the same results can be achieved at a lower voltage.

The temperature can be crucial for optimal recovery of heavy metal ions. Rising temperature results from the collapse of acoustic cavitation bubbles in the solution. Collapsing of these bubbles produces high temperature and pressure. Temperature increase also enhances the deposition rate because of the increased degree of dissociation of electrolyte. The viscosity of the electrolyte decreases at high temperature, therefore, the diffusion rate and the velocity of lead ions is increased.

The Recovery and energy consumption of lead from 100 mgL$^{-1}$ solution at ultrasonic frequencies of 40 KHz and at pH 3 is described in Table 3. In four hours, the use of ultrasound showed best results in low concentration. It shows that the electrolysis with ultrasonic technology is more effective in lower concentration of solutions and thus the well-known problem of the removal of metals at low concentration is successfully solved with ultrasonic-assisted electrolysis.

TABLE 3

Recovery and energy consumption of lead from 100 mg/L concentration of lead nitrate at the frequency of 40 kHz and at pH 3 with plate electrodes

| | US on | | US off | |
|---|---|---|---|---|
| Time (hr) | Recovery % | Energy consumption (kWh/mg) | Recovery % | Energy consumption (kWh/mg) |
| 1 | 52.4735 | 0.095455 | 25.74906 | 0.206182 |
| 2 | 76.32509 | 0.067593 | 48.8764 | 0.111877 |
| 3 | 90.28269 | 0.058806 | 63.10861 | 0.089169 |
| 4 | 95.84806 | 0.056959 | 67.22846 | 0.086072 |

In the comparison with electrode types (plates and mesh), mesh electrodes showed 98.5% recovery in 3 hrs, whereas there is only 73.35% recovery by using plate electrodes. It was due to increase in the surface area more for lead deposition and their pores allow the diffusion of ions inside the solution. The results obtained showed that mesh cathode was better than plate cathode for the removal of lead from 100 $mgL^{-1}$ solutions.

It is known that the deposition of metal on the cathode surface is affected by the stirring rate. High stirring rates increase the percentage removal because of more efficient mixing of the solution during electrolysis process. This mixing breaks the diffusion layer around the cathode surface and aids movement of cations towards the surface of the cathode. This mixing rate is higher in mesh cathode compared to plate cathode, which in turn increases the percentage removal. Secondly, there is a higher removal rate of lead on mesh cathode because of high surface area of the metal compared to plate cathode. Mesh cathodes also consume less energy than plate cathodes. There is also a significant reduction in energy consumption during metal recovery by using mesh cathode in the presence of ultrasonic field (Table 2).

The increase of the ultrasonic frequency results in increased percentage recovery in less time and thus resulted in less energy consumption. For example at the frequency of 100 KHz almost 99.9% recovery of lead is achieved only in 2 hours instead of 3 hours. Energy consumption studies showed that the energy consumption is reduced to one-third of that required at 40 KHz (Table 4). The increase in the rate of removal can be described due to the increased number of cavitations.

TABLE 4

Effect of ultrasound on the energy consumption after 2 hours of electrolytic recovery of 100 mg/L of Lead
Energy Consumption (kWh/mg)

| Time (sec) | Mesh electrode + 0 kHz | Mesh electrode + 40 kHz | Mesh electrode + 100 kHz |
|---|---|---|---|
| 30 | 0.023 | 0.014 | 0.0098 |
| 60 | 0.047 | 0.028 | 0.0195 |
| 90 | 0.069 | 0.042 | 0.029 |
| 120 | 0.093 | 0.056 | 0.039 |

The electrodes can be adjusted at different distances within the electrolysis chamber. In electrolysis process without ultrasound, the maximum recovery is observed at 3 cm distance apart in the reaction vessel. However, the distance of electrodes is unaffected in the presence of ultrasound. It was observed that the longer the current is left to flow, the more lead metal is deposited on the cathode. In electrolysis process, deposition rate decreased when the deposition time was over one hour as, but this deposition rate was enhanced by using ultrasonic agitations.

Therefore, an optimal mode of application would involve the following in-process controls: pH=3-3.5; voltage=10 V; temperature=25-40° C.; concentration of metals in solutions 50-200 mg/L; type of electrodes=mesh electrodes; frequency of ultrasound=100 KHz; retention time=1-2 hours.

The invention described here thus offers an ideal combination of parameters leading to a commercially viable method of removing heavy metals of common contamination including such difficult metals to remove as lead, copper and nickel.

The invention described here claims that ultrasound-electrolysis technique is more effective when metal concentration is low i.e., 50 to 200 $mgL^{-1}$. The removal of metals through deposition is a function of the diffusion layer thickness and hence difficult to achieve for dilute solutions, the kind which is often found in the industrial effluent. In this invention, the main objective was to use ultrasonic waves was to reduce the thickness of the diffusion layer by using an ultrasonically agitated bath. Since the compression and rarefaction cycles in an ultrasonic system produce alternative regions of high and low pressure forming vacuum bubbles, on the surface of these bubbles, metal ions attach themselves. When these bubbles rapidly grow and implode, they generate high pressure/temperature hot spots. The high temperature and pressure increase the speed of ions attached on the surface of imploding bubbles. Thus they act as energetic bullets which tear the diffusion layer and thus reduce its thickness. Thus, the transport of the dilute metal species is facilitated and results in increased percentage removal adding to efficiency and decrease in the energy consumption over conventional standard electrochemical cell where the thickness of diffusion layer is difficult to reduce. So the use of proper distances between the electrodes, pH adjustment and ultrasound has successfully solved this problem.

The invention described here is not limited to any specific design of instrumentation however, different dimensions of the systems would require some trial and error based on the parameters described and what would be expected from someone who is familiar with art and thus not placing any burden on replicating the invention described here.

What is claimed is:

1. A method, comprising:
   electrolyzing a wastewater solution in an electrolysis chamber comprising a cathode of stainless steel mesh and an anode of platinized titanium mesh, the wastewater solution comprising lead ions at a starting concentration between 50 and 500 mg/L;
   maintaining a first set of conditions of temperature and pH for the solution for greater than 1 hour and less than 2 hours for lead recovery from the wastewater; and
   applying an ultrasound wave at a frequency of 100 kHz to the wastewater solution during the electrolyzing to remove the lead ions from the wastewater solution,
   wherein the first set of conditions comprises a pH of the solution being in a range of 3 to 3.5, and
   wherein energy consumption is kept below 0.04 KWh/mg for the lead recovery.

2. The method of claim 1, wherein applying the ultrasound wave comprises generating ultrasonic agitation via cavitations.

3. The method of claim 1, wherein electrolyzing the solution comprises:

applying a voltage difference of about 10 volts to the cathode and the anode.

4. The method of claim 1, wherein electrolyzing the solution comprises applying a voltage difference of about 10 volts to the cathode and the anode, and
wherein maintaining the first set of conditions comprises maintaining the temperature between 25° C. and 40° C.

* * * * *